(12) United States Patent
Kimes et al.

(10) Patent No.: US 7,223,198 B2
(45) Date of Patent: May 29, 2007

(54) AUTOMATIC TRANSMISSION CARRIER ASSEMBLY INCLUDING AN OVERRUNNING BRAKE

(75) Inventors: John W. Kimes, Wayne, MI (US); Bernie J. Simon, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 190 days.

(21) Appl. No.: 11/077,533

(22) Filed: Mar. 10, 2005

(65) Prior Publication Data
US 2006/0025279 A1    Feb. 2, 2006

Related U.S. Application Data

(63) Continuation-in-part of application No. 10/899,918, filed on Jul. 28, 2004, now Pat. No. 7,100,756.

(51) Int. Cl.
*F16H 57/08* (2006.01)
*F16H 3/44* (2006.01)

(52) U.S. Cl. ..................... 475/331; 475/324

(58) Field of Classification Search ............ 475/323, 475/324, 259, 331; 74/333; 192/46, 69.1, 192/71, 48.6, 48.92
See application file for complete search history.

(56) References Cited

U.S. PATENT DOCUMENTS

| 709,900 A | 9/1902 | Gurney et al. |
|---|---|---|
| 1,883,966 A | 10/1932 | Krause |
| 2,013,765 A | 9/1935 | Richardson |
| 2,134,405 A | 10/1938 | Hulshizer |
| 2,323,353 A | 7/1943 | Plog |
| 2,710,504 A | 6/1955 | Dodge |
| 3,197,001 A | 7/1965 | Clements |
| 3,527,327 A | 9/1970 | McCreary |
| 3,540,309 A * | 11/1970 | Shimano et al. ............ 475/259 |
| 3,563,354 A | 2/1971 | Sigg |
| 3,978,742 A | 9/1976 | Abbott |
| 3,997,041 A | 12/1976 | Judd et al. |
| 4,114,478 A | 9/1978 | Clauss |
| 4,363,390 A | 12/1982 | Eisend et al. |
| 5,064,037 A | 11/1991 | Long, Jr. |
| 5,070,978 A | 12/1991 | Pires |
| 5,143,189 A | 9/1992 | Meier-Burkamp |
| 5,152,726 A | 10/1992 | Lederman |

(Continued)

FOREIGN PATENT DOCUMENTS

FR    548490    1/1923

(Continued)

*Primary Examiner*—Roger Pang
(74) *Attorney, Agent, or Firm*—David B. Kelley; MacMillan, Sobanski & Todd

(57) ABSTRACT

A carrier assembly for a planetary gearset of a transmission includes a pinion carrier, a one-way brake having a rocker ring integral with the carrier and having multiple pockets mutually spaced about an axis and located on an outer radial surface of the carrier. A cam ring includes multiple notches angularly spaced about the axis and facing the rocker ring. A rocker, located in each pocket, pivots about a pivot center to engage the cam ring, and a spring urges each rocker to pivot toward engagement with the cam ring. A hydraulically actuated friction brake secured to the carrier alternately holds the carrier against rotation relative to a housing and permits the carrier to rotate.

18 Claims, 5 Drawing Sheets

U.S. PATENT DOCUMENTS

| | | | |
|---|---|---|---|
| 5,511,642 A * | 4/1996 | Klotz et al. | 192/45 |
| 5,853,073 A | 12/1998 | Costin | |
| 5,947,245 A | 9/1999 | Costin et al. | |
| 5,954,174 A | 9/1999 | Costin | |
| 5,971,122 A | 10/1999 | Costin et al. | |
| 5,979,627 A * | 11/1999 | Ruth et al. | 192/55.6 |
| 6,062,362 A * | 5/2000 | Costin et al. | 192/46 |
| 6,109,410 A | 8/2000 | Costin | |
| 6,149,543 A | 11/2000 | Breen | |
| 6,557,682 B2 * | 5/2003 | Imamura | 192/48.5 |
| 6,575,275 B2 | 6/2003 | Muramatsu et al. | |
| 6,679,364 B2 | 1/2004 | Muramatsu et al. | |
| 2002/0056602 A1 | 5/2002 | Aurora | |
| 2002/0112933 A1 | 8/2002 | Yamamoto et al. | |
| 2002/0148697 A1 | 10/2002 | Muramatsu et al. | |
| 2004/0016616 A1 | 1/2004 | Stefina | |
| 2004/0110598 A1 | 6/2004 | Blair et al. | |
| 2006/0021835 A1 | 2/2006 | Kimes et al. | |

FOREIGN PATENT DOCUMENTS

| | | | |
|---|---|---|---|
| GB | 2116 | 0/1907 | |
| GB | 740692 | 11/1955 | |
| JP | 356156549 A * | 12/1981 | 475/285 |

* cited by examiner

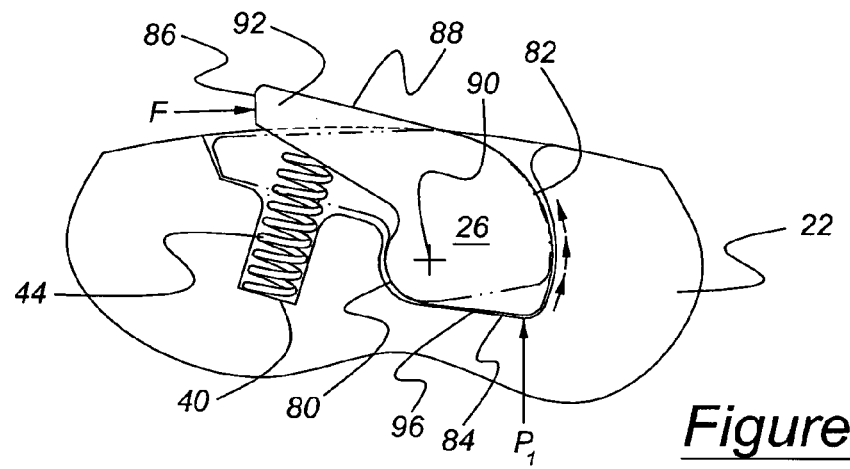
*Figure 4*
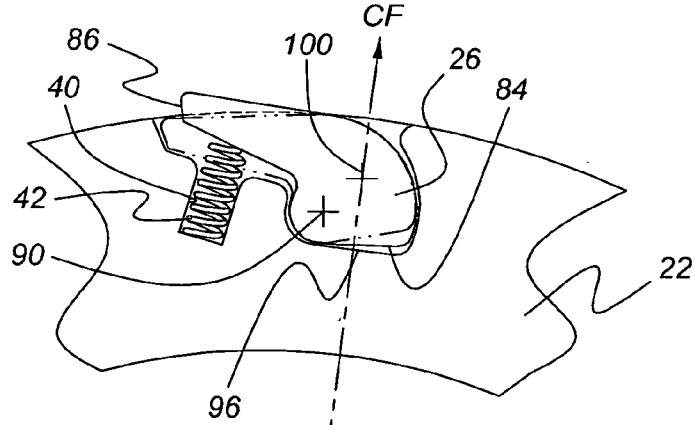
*Figure 5*
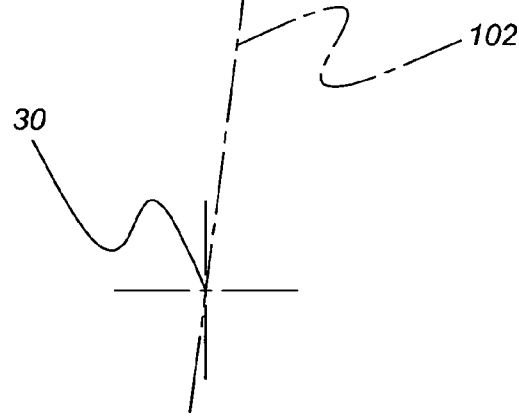

AUTOMATIC TRANSMISSION CARRIER ASSEMBLY INCLUDING AN OVERRUNNING BRAKE

CROSS REFERENCE TO RELATED APPLICATION

This application is a continuation-in-part of U.S. application Ser. No. 10/899,918, filed Jul. 28, 2004 now U.S. Pat. No. 7,100,756.

BACKGROUND OF THE INVENTION

1. Field of the Invention

The invention relates in general to automatic transmission planetary carrier assembly having a one-way brake that produces a drive connection in one rotary direction and overruns in the opposite direction. In particular, the invention pertains to such an assembly also having a friction brake in parallel with the one-way brake.

2. Description of the Prior Art

Conventional one-way brakes for producing a one-way drive connection between inner and outer races of the brake assembly include sprags or rollers for releasably driveably connecting the races and the components of a mechanical assembly connected to the races. Such brakes are commonly used in the powertrain or driveline of an automotive vehicle. One-way brakes perform satisfactorily in many cases, but certain applications, such as those in which a large magnitude of torque is transmitted by the brake, or those that provide only a small space for the brake, require one-way brakes other than conventional sprag-type or roller-type brake to meet desire requirements.

Conventional one-way brakes and clutches have at least one sprag or roller, which driveably locks two notched or pocketed races together mutually in one rotary direction and allows the races to rotate freely in the other direction. Rocker and sprag type one-way brake assemblies can increase the torque capacity for a given package size compared to those of a roller-type brake, but they are generally limited in torque transmitting capacity by the magnitude of the contact or bearing stresses caused by contact of the rockers or sprags with the races.

To overcome these and other difficulties, a one-way overunning clutch described in U.S. Pat. No. 5,070,978 includes a drive member and a driven member, which are mounted for clockwise and counterclockwise rotation about a common axis. The drive member includes a planar drive face, normal to the common axis, which connects with a source of power for rotating the planar drive face either clockwise or counterclockwise. The driven member includes a planar driven face, positioned in close proximity to and in confronting relationship with the drive face. The drive and driven members are coupled to one another through a series of pockets in one of the drive faces, and a plurality of cooperating struts carried by the other face, such that when the drive member is driven counterclockwise, it drives the driven member with it. When the drive member is driven clockwise, it does not drive the driven member, but rotates freely relative to the driven member. Column stability of the strut, which transmits the torsion load between the races, is an important factor in the design.

U.S. Pat. No. 5,954,174 discloses a ratchet one-way clutch assembly having an inner race with notches, an outer race with pockets, and rockers located in the pockets to engage the notches. The rockers have a pivot ridge which mates with a peak or recess in the pockets in the outer race to position the rocker in the pocket. The center of mass of each rocker is located such that the rocker tends to engage or disengage a notch in the inner race. A spring is used to provide a tilting force on each rocker directed to produce engagement of the rocker with a notch.

Conventional one-way brakes and clutches develop relatively large magnitudes of hoop stress in the races when torque is transmitted through the brake; therefore, the races of conventional one-way brakes are formed of bearing grade steel in order to withstand the operating hoop stress. Because the clutches disclosed in the '978 and '245 patents develop relative low operating hoop stresses in service, those clutches can be formed of powered metal. Clutches formed of powered metal potentially can be produced at relatively low cost compared to the cost to form and produce a conventional clutch or brake of high grade steel, provided extensive machining is avoided.

The clutches described in the '978 or '245 patents, however, require a significant amount of machining of the components that are formed of powered metal. Excessive internal backlash, which can produce noise at unacceptable levels, is a potential problem under certain operating conditions with these clutches.

A need exists for a reliable, low cost automatic transmission one-way brake that produces low operating bearing stresses in service and can be formed readily from powered metal. Preferably, the brake would be integrated in an assembly that includes a planet pinion carrier such that the assembly occupies little space, minimizes in-service noise, and requires little or no machining. Preferably, the assembly would include features that facilitate its assembly in a vehicle transmission, and would further include a hydraulically actuated friction brake arranged in parallel with the one-way brake.

SUMMARY OF THE INVENTION

The present invention relates to a planet pinion carrier for an automatic transmission. The assembly includes a one-way brake having an inner race, outer race, and pivoting rockers, which driveably connect the races in one rotary direction and overrun in the opposite direction. The brake is readily formed of powered metal. The rockers are located in one of the races such that the brake can employ centrifugal force to assist in disengaging the rockers from a cam ring during an overrun condition by biasing the rockers to pivot away from the notch plate. Alternately, the brake can employ centrifugal force to assist in engaging the rockers with the cam ring by urging the rockers to pivot toward the cam ring.

According to this invention, a carrier assembly for a planetary gearset of a transmission includes a pinion carrier, a one-way brake having a rocker ring integral with the carrier and having multiple pockets mutually spaced about an axis and located on an outer radial surface of the carrier. A cam ring includes multiple notches angularly spaced about the axis and facing the rocker ring. A rocker, located in each pocket, pivots about a pivot center to engage the cam ring, and a spring urges each rocker to pivot toward engagement with the cam ring. A hydraulically actuated friction brake secured to the carrier alternately holds the carrier against rotation relative to a housing and permits the carrier to rotate. A retainer ring resiliently engages a recess and secures the rockers in the pockets such that no interference with the rotating rockers occurs. The retaining ring eliminates need for a snap ring.

The shape of a pocket ring, which contains the rockers, uniquely requires no secondary machining operations for any purpose, such as to eliminate densifiers and de-densifiers in the powered metal components. The components of the brake that are formed from powered metal require no machining after they are formed.

The number of notches for a given diameter is greater than other one-way brakes, thereby significantly reducing backlash. The design lends itself to easy assembly due to its configuration. A pinion carrier-rocker ring subassembly containing the rockers and a return spring prevents the rockers from exiting the pockets laterally by forcing each rocker into contact with its pocket. This arrangement permits the subassembly to be handled and transported prior to its installation with the rockers and springs already installed in the carrier.

Various objects and advantages of this invention will become apparent to those skilled in the art from the following detailed description of the preferred embodiment, when read in light of the accompanying drawings.

BRIEF DESCRIPTION OF THE DRAWINGS

FIG. 4 is side view of a portion of an inner race showing a rocker, pocket and return spring;

FIG. 5 is a side view of a portion of an inner race showing a rocker, pocket, return spring, and a centrifugal force vector;

DETAILED DESCRIPTION OF THE PREFERRED EMBODIMENT

Figure 1:
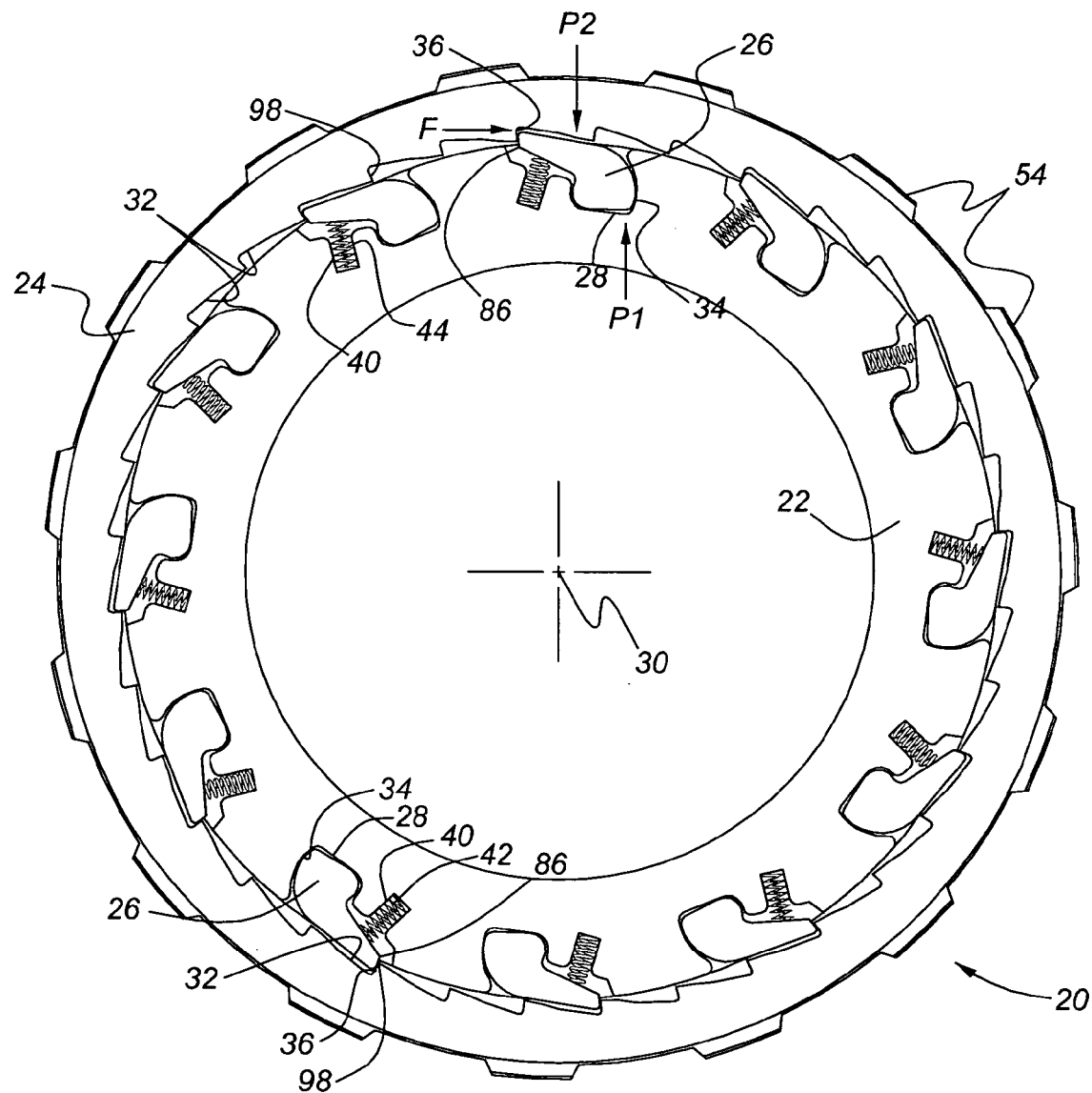
FIG. 1 is an end view of an overrunning brake according to the present invention showing rockers located in a rocker ring and engaged with notches on a cam ring.

Referring now to the drawings, there is illustrated in FIG. 1 a one-way brake assembly 20 in accordance with the present invention integrated with a planetary pinion carrier for an automatic transmission. The brake assembly 20 includes an inner race or rocker ring 22 formed integrally with a pinion carrier 23, an outer race or cam ring 24, and a plurality of rockers 26, each rocker being located in a pocket 28 formed in the inner race 22 and angularly spaced mutually about a central axis 30. The inner periphery of the outer race 24 is formed with a plurality of cams or notches 32 angularly spaced mutually about axis 30. There are twelve rockers 26 and pockets 28 and thirty-six notches 32 in the brake illustrated in FIG. 1.

When the inner race 22 and carrier 23 rotate clockwise faster than the outer race 24, each rocker 26 pivots counterclockwise in its pocket 28 away from engagement with the notches 32 due to contact of the rockers with the inner radial surface of the outer race. This allows the inner race 22 and carrier 23 to rotate freely clockwise about axis 30 relative to the outer race 24. When the inner race 22 and carrier 23 attempt to rotate counterclockwise relative to the outer race 24, the inner race, carrier and outer race are engaged or driveably connected mutually by engagement of the rockers 26 with the notches 32.

When brake 20 is engaged, each engaged rocker 26 transmits a force F between the inner and outer races 22, 24 due to its contact with the inner surface 34 of the pocket and with the radially directed surface 36 of the engaged notch 32.

Figure 10:
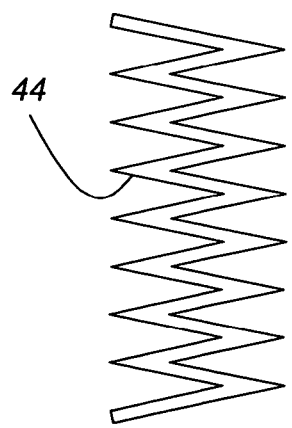
FIG. 10 is a side view of an accordion spring.
Figure 11:
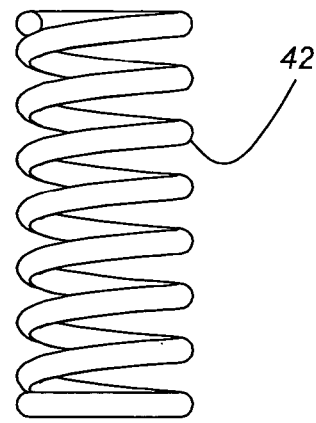
FIG. 11 is a side view of a helical spring.

A recess 40, located at each pocket 28, contains a spring, such as a helical coiled compression spring 42 or an accordion compression spring 44, for urging each rocker to pivot in its pocket toward engagement with the notches. FIGS. 10 and 11 show compression springs suitable for use in the overrunning brake 20.

Figure 2:
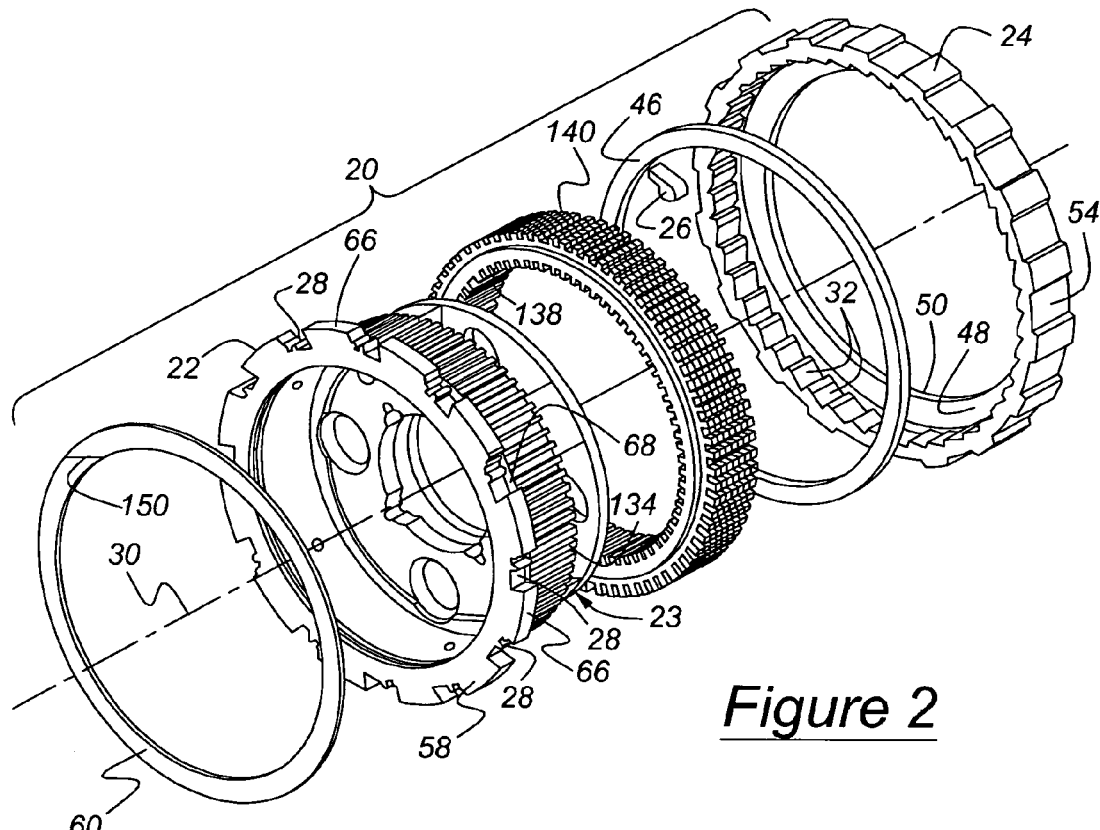
FIG. 2 is an isometric view of a pinion carrier assembly showing the components mutually spaced axially.

FIG. 2 is an isometric view showing a pinion carrier assembly that includes a rocker ring 22 formed integrally with the pinion carrier 23 with angularly spaced pockets 28. When assembled, each pocket of the rocker ring 22 contains a rocker 26, which pivots in its pocket alternately to engage and to disengage the notches 32 formed on the radial inner surface of the cam ring 24. A hydraulically actuated friction brake releasably connects the carrier 23 and a transmission housing, alternately holding the carrier against rotation relative to the housing and permitting such rotation.

Figure 3:
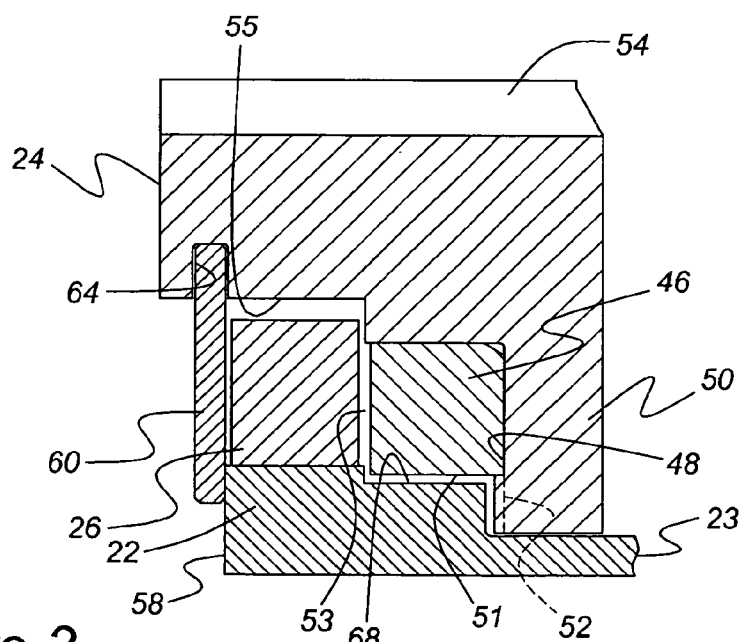
FIG. 3 is a side view in cross section through a diametric plane showing a portion of the assembly with the components assembled.

Referring to FIG. 3, when the carrier is assembled, an axial surface of a bushing 46 contacts an inner axial surface 48 of a radial flange 50 of the cam ring 24. Surface 48 is formed with radially directed grooves 52, which carry fluid lubricant, preferably transmission oil, radially outward to a radial inner surface 51 of the bushing 46. Oil enters the radial grooves 52 and travels axially leftward across the inner radial surface 51 on the bushing 46, to a radial space 53, which directs the oil radially outward to surface 55, across the width of the rocker ring 22 and across the surface of the rockers 26. Bushing 46 pilots the rings 22, 24 into their correct positions and eliminates need to machine along the notches or cams 32 of the cam ring 24 or the radial outer surface area 68 of the rocker ring 22. Lubricating oil is precisely directed radially along grooves 52 to the bushing 46, then axially between surfaces 68 on the rocker ring 22 and the radial inner surface 51 of the bushing 46 to the rockers 26. The lubricant flows along this path due to a centrifugal pressure head developed as the brake rotates about axis 30. An axial surface 58 of rocker ring 22 contacts a retaining ring 60, which closes the axial end of each pocket 28, resiliently engages a recess 64 formed on the cam ring 24, and is retained in the recess. Retaining ring 60 secures the components in position of the carrier 23.

FIG. 4 illustrates a rocker 26 that includes several surfaces 80, 82, 84, 86, 88, and a defined pivot center 90. Surfaces 80 and 82 are both circular cylindrical surfaces whose arcs are concentric with the pivot center 90. Surfaces 80, 82 guide rotation or pivoting of the rocker 26 and limit that pivoting to one degree of freedom. The arcs of both surfaces 80, 82 must be sufficient such that the neck or strut portion 92 of the rocker is narrower than the counterweight portion 94 in order to restrain the rocker in the radial direction from center 90.

Surface 80 is a guiding surface. When force F is applied while the clutch is driving and the rockers 26 are engaged with the notches 32, preferably no reaction force is developed on surface 80. Surface 82 is a surface on which the reaction to force F is developed when clutch 20 is transmitting torque between the outer race and inner race 22 through the rocker 26. Because the center of surface 82 is located at the pivot center 90, the reaction to force F is distributed along surface 82, is centered at pivot center 90, and produces no torque tending to pivot the rocker 26 about the pivot center.

Surface 84 limits clockwise pivoting of the rocker 26 and assists assembly of the race 22 or 24 that contains the pockets 28, rockers 26 and springs 42, 44. That race is prepared for installation by inserting a rocker 26 in each pocket and placing a spring 42, 44 in each recess 40. The force applied by the spring on its respective rocker rotates the rocker to the position shown in FIG. 6 where surface 84 contacts the base 96 of the pocket 28. The spring force and its reaction force on the base 96 retains the rocker in the pocket without the presence of the other race or another assembly aid. The race containing the rockers can be transported readily with the rockers in this retained condition preparatory to installing the race subassembly in the clutch assembly 20.

By limiting pivotal rotation of the rocker 26 about pivot center 90, a counter-rotation reaction force on the strut is generated at surface 84 when the clutch is driving or engaged. When clutch 20 is driving, force F, applied to rocker surface 86, produces a clockwise torque on the rocker about the pivot center 90. Torque about center 90 produced by force F is reacted by a force P1 where rocker surface 84 contacts pocket surface 96. Without surface 84, the full reaction torque would be reacted elsewhere. For example, if the full torsion reaction to force F were applied to rocker surface 88, a large hoop stress would be generated on the race contacted by surface 88 tending to shear the wall of that race due to a high angle of incidence of the reaction force. If the torsion reaction to force F were applied to surface 82, it would be applied at the extremity of the inner race at its weakest point. Preferably, the torsion reaction to force F is located normal to the pocket base 96 at rocker surface 84, and on surface 82 where friction is developed due to contact with the pocket.

Surface 86 is the surface on which force F is applied when the clutch 20 is driving and the rockers 26 are engaged with the radial surfaces 36 of the notches 32. Surface 86 performs this function by creating a mechanical interference when the rocker is pivoted to the engaged position.

Surface 88, located at the contour of the strut portion 92 of the rocker 26, contacts the crest 98 of the radial surfaces 36 of the notches 32 to ensure no interference when the clutch 20 is overrunning and the rockers 26 are disengaged from the notches 32. Surface 88 is curved to facilitate formation of a film of lubricant while the clutch is overrunning. Surface 88 is curved also to minimize impact with the crests 98 while the clutch overruns by providing transitional positions that minimize the rate of rotation of the rocker into the pocket relative to the rate of rotation of the outer race. This minimizes angular acceleration on the rocker as the clutch overruns.

The center of mass 100 of the rocker 26 can be located in relation to the pivot center 90 such that centrifugal force tends either to engage or to disengage the rocker, whether the rocker is located on the outer race or the inner race.

When viewed as in FIG. 5 the center of mass 100 is located rightward from a line connecting the axis 30 and the pivot center 90, and the rocker is carried in a pocket located on an inner race 22. As the clutch assembly 20 rotates about axis 30, centrifugal force on the rocker is directed radially outward along a line 102 that passes through axis 30 and the center of mass 100, causing the rocker 26 to pivot counter-clockwise about the pivot center 90. This counterclockwise pivoting of the rocker opposes the force of the spring 42, 44 and tends to pivot rocker surface 86 away from contact with pocket surface 36 on the inner race 24. This counterclockwise pivoting of the rocker tends to move the rocker to a disengaged position, and allows the inner race 22 to overrun and the clutch 20 to disengage. The magnitude of the moment about pivot center 100 tending to compress spring 42 and to pivot the rocker 26 to the disengaged position varies with the speed of rotation of the inner race and the distance of the center of mass 100 from the pivot center 90.

Alternatively the center of mass may be located leftward from a line connecting the axis 30 and the pivot center 90, when the rocker is carried in a pocket located on an inner race 22. In that case, as the clutch assembly 20 rotates about axis 30, centrifugal force on the rocker causes the rocker 26 to pivot clockwise about the pivot center 90. This clockwise pivoting of the rocker adds to the effect of the force of spring 42, tends to move surface 86 of the rocker toward contact with radial surface 36 on the outer race 24, i.e., to pivot the rocker 26 to an engaged position, and causes the clutch to engage.

Figure 6:
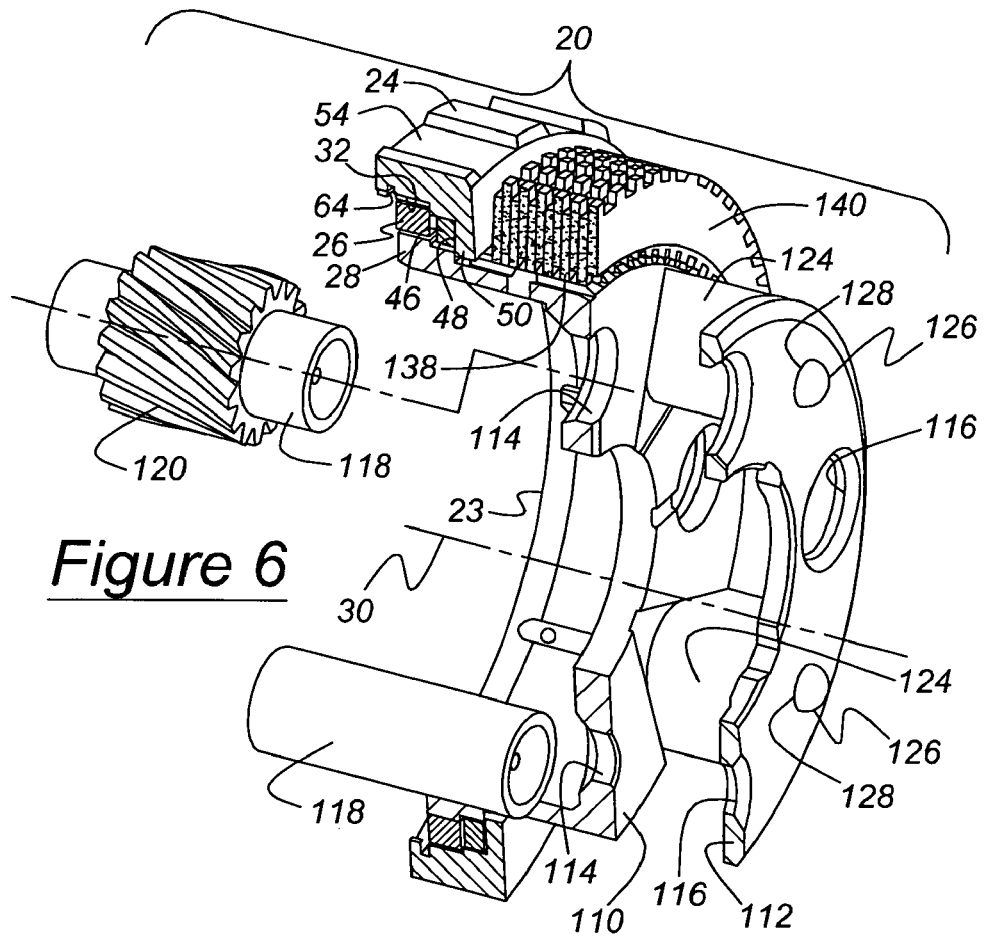
FIG. 6 is an isometric view of the carrier assembly, cross-sectioned at a diametric plane, showing the components assembled.
Figure 7:
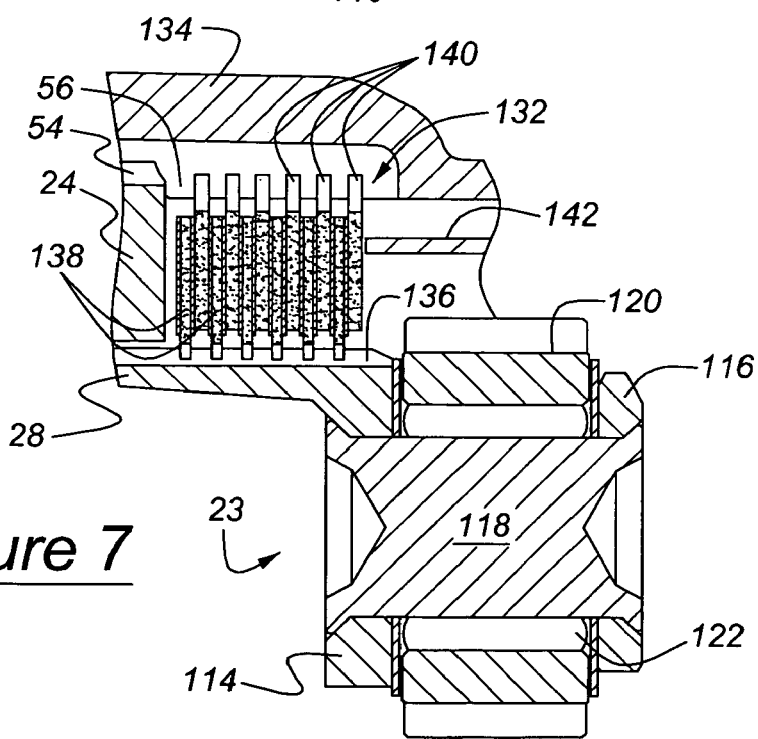
FIG. 7 is a cross section taken at a diametric plane through a friction brake portion of the assembly and the adjacent components.

FIGS. 6 and 7 show the radial outer surface of the cam ring 24 formed with axial splines 54, by which the cam ring is driveably connected to a splined inner surface 56 of the transmission housing 57. Carrier 23 includes axially spaced pinion support plates 110, 112, formed with pairs of axially aligned holes 114, 116, the hole pairs being angularly spaced about axis 30. Pinion support shafts 118, supported on the carrier plates 110, 112 at each pair of axial holes 114, 116, each supports a planetary pinion 120 on a bearing 122. Each planet pinion 120 is engaged with a sun gear at a radially inner location concentric with axis 30 and with a ring gear at the radially outer periphery of the carrier 23. Plate 112 is spaced axially from plate 110 by axial legs 124, spaced angularly about axis 30. Rivets 126, located in axially aligned holes 128 formed on the plates 110, 112 at each leg 124 location, secure the plates 110, 112 mutually and establish their correct axial and angular spacing.

A hydraulically actuated friction brake 132 releasably connects the carrier 23 and the transmission housing 134, alternately holding the carrier against rotation relative to the housing and permitting rotation. A radial outer surface of the carrier 23 is formed with axial splines 136, which are engaged by splines formed on the radial inner periphery of brake discs 138 having friction material on opposites axial sides. Spacer plates 140, which are interleaved with the brake discs 138, engage the axial splines 56 formed on the inner surface of the housing. A hydraulically actuated brake piston 142, is forced by hydraulic pressure into contact with the pack of clutch discs and spacer plates to engage the brake 132 due to friction contact between the discs 138 and plates 140. A return spring, usually a Belleville spring (not shown), forces the piston 142 away from contact with the disc and plate pack, whereby the brake 132 is disengaged.

Figure 8:
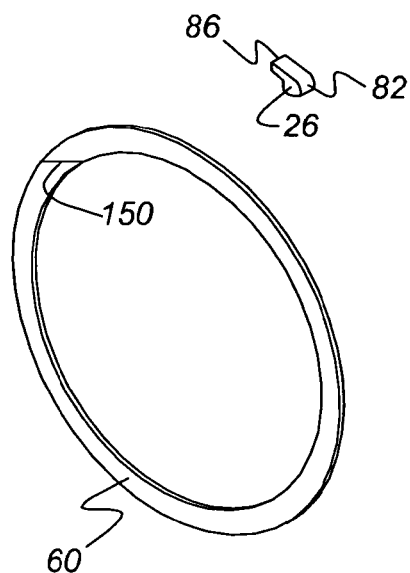
FIG. 8 is an isometric view of a retaining ring and a rocker.
Figure 9:
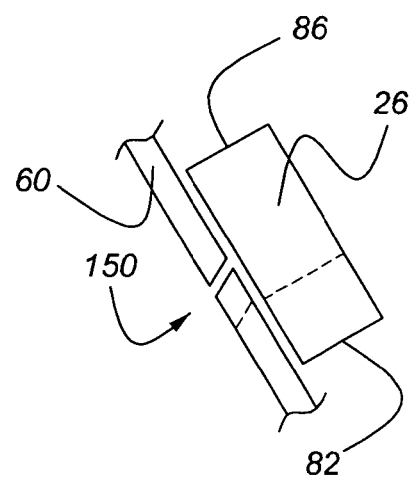
FIG. 9 is a top view of the retaining ring and rocker.

As shown in FIGS. 8 and 9, the retainer ring 60 is formed with a scarf cut 150 extending axially through the ring's thickness and radially across its width. Preferably, the ring 60 is installed in the recess 64 such that the cylindrical surface 82 of the rockers 26, which is located opposite surface 86, passes the scarf cut 150 first before surface 86 when the brake is overrunning and disengaged. This arrangement reduces the possibility that surface 86 of a rocker will engage the scarf joint and be prevented by contact with the scarf cut from pivoting in its pocket radially outward into engagement with the cam ring 24 when the overrunning brake 20 is to become engaged.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A carrier assembly for a planetary gearset of a transmission comprising:
   a pinion carrier including a rocker ring formed with pockets mutually spaced about an axis of rotation and located on an outer radial surface of the carrier;
   a cam ring including notches angularly spaced about the axis and facing the rocker ring and pockets;
   multiple rockers, each rocker being located in a respective pocket for pivoting movement about a pivot center toward engagement with the cam ring, each rocker including first and second exterior partial cylindrical surfaces centered at the pivot center, said first surface being spaced a first radial distance from the pivot center, said second surface being spaced a second radial distance from the pivot center, the first and second distances being unequal; and
   multiple springs, each spring urging a rocker to pivot toward engagement with the cam ring.

2. The carrier assembly of claim 1, wherein the cam ring further comprises:
   splines formed on a radial outer surface for engaging splines on a transmission housing and holding the cam ring fixed on the housing against rotation relative to the pinion carrier.

3. The carrier assembly of claim 1, further comprising:
   pinion support shafts angularly spaced about the axis and supported on the carrier; and
   a planet pinion rotatably supported on each pinion support shaft.

4. The carrier assembly of claim 1, wherein:
   each pocket defines a pivot center; and
   each rocker includes a center of mass positioned relative to said pivot center such that, upon rotation of the rocker ring, each rocker is biased by centrifugal force toward engagement with the cam ring.

5. The carrier assembly of claim 1, wherein:
   each pocket defines a pivot center; and
   each rocker includes a center of mass positioned relative to said pivot center such that, upon rotation of the rocker ring, each rocker is biased by centrifugal force away from engagement with the cam ring.

6. The carrier assembly of claim 1 wherein a second axis passing through each pivot center extends to a rocker located in a pocket.

7. The carrier assembly of claim 1 wherein each pocket further comprises:
   first and second partial cylindrical surfaces having a center located at a pivot center, spaced radially from, and extending angularly about said pivot center in circular arcs, for guiding pivotal movement of a rocker located in the pocket.

8. The carrier assembly of claim 1, farther comprising a bushing located in a space between the cam ring and the rocker ring, including a pilot surface for guiding the rocker ring into an assembled position relative to the cam ring.

9. The carrier assembly of claim 1, wherein the cam ring is formed with an annular recess, and the assembly further comprising a retaining ring resiliently engaged with the recess and located adjacent an axial surface of the rocker ring and the rockers.

10. The carrier assembly of claim 1, further comprising:
    second splines formed on a radial outer surface of the carrier; and
    a friction brake including a first group whose members are brake discs and a second group whose members are spacer plates interleaved with the brake discs, members of one of the first group and second group engaged with the second splines, members of other of the first group and second group including a radial outer periphery formed with third splines for engaging splines on a transmission housing, whereby the pinion carrier is alternately secured to the housing against rotation when the friction brake is engaged and free to rotate when the friction brake is disengaged.

11. A carrier assembly for a planetary gearset of a transmission comprising:
    a pinion carrier including a rocker ring formed with pockets mutually spaced about an axis of rotation and located on an outer radial surface of the carrier;
    a cam ring including notches angularly spaced about the axis and facing the rocker ring and pockets, the cam ring including splines formed on a radial outer surface for engaging a nonrotating housing and holding the cam ring fixed on the housing against rotation relative to the pinion carrier;
    multiple rockers, each rocker being located in a respective pocket for pivoting movement about a pivot center toward engagement with the cam ring, each rocker including first and second exterior partial cylindrical surfaces centered at the pivot center, said first surface being spaced a first radial distance from the pivot center, said second surface being spaced a second radial distance from the pivot center the first and second distances being mutually unequal;
    multiple springs, each spring urging a rocker to pivot toward engagement with the cam ring;
    pinion support shafts angularly spaced about the axis and supported on the carrier; and
    a planet pinion rotatably supported on each pinion support shaft.

12. The carrier assembly of claim 11, wherein:
    each pocket defines a pivot center; and
    each rocker includes a center of mass positioned relative to said pivot center such that, upon rotation of the rocker ring, each rocker is biased by centrifugal force toward engagement with the cam ring.

13. The carrier assembly of claim 11, wherein:
    each pocket defines a pivot center; and
    each rocker includes a center of mass positioned relative to said pivot center such that, upon rotation of the rocker ring, each rocker is biased by centrifugal force away from engagement with the cam ring.

14. The carrier assembly of claim 11 wherein a second axis passing through each pivot center extends to a rocker located in a pocket.

15. The carrier assembly of claim 11 wherein each pocket further comprises:
    first and second partial cylindrical surfaces having a center located at a pivot center, spaced radially from, and extending angularly about said pivot center in circular arcs, for guiding pivotal movement of a rocker located in the pocket.

16. The carrier assembly of claim 11, further comprising a bushing located in a space between the cam ring and the rocker ring, including a pilot surface for guiding the rocker ring into an assembled position relative to the cam ring.

17. The carrier assembly of claim 11, wherein the cam ring is formed with an annular recess, and the assembly further comprising a retaining ring resiliently engaged with the recess and located adjacent an axial surface of the rocker ring and the rockers.

18. The carrier assembly of claim 11, further comprising:
second splines formed on a radial outer surface of the cater; and
a friction brake including a first group whose members are brake discs and a second group whose members are spacer plates interleaved with the brake discs, members of one of the first group and second group engaged with the second splines, members of other of the first group and second group including a radial outer periphery formed with third splines for engaging splines on a transmission housing, whereby the pinion carrier is alternately secured to the housing against rotation when the friction brake is engaged and free to rotate when the friction brake is disengaged.

* * * * *